United States Patent
Zoidis et al.

(10) Patent No.: US 7,188,958 B2
(45) Date of Patent: Mar. 13, 2007

(54) PROJECTION ARRANGEMENT AND ELECTRONIC CUSTOMER DEVICE

(75) Inventors: Evangelos Zoidis, Waiblingen (DE); Frederic Ludley, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 10/902,407

(22) Filed: Jul. 28, 2004

(65) Prior Publication Data
US 2005/0052626 A1    Mar. 10, 2005

(30) Foreign Application Priority Data
Jul. 30, 2003   (EP)   ................................. 03017286

(51) Int. Cl.
*G03B 21/14*   (2006.01)
(52) U.S. Cl. ......................................... 353/119; 353/42
(58) Field of Classification Search ................ 353/119, 353/120, 43, 39, 42, 122
See application file for complete search history.

(56) References Cited

U.S. PATENT DOCUMENTS

| | | | | |
|---|---|---|---|---|
| 5,170,196 A | | 12/1992 | Itoh | |
| 5,663,762 A | * | 9/1997 | Nishiyama | 348/373 |
| 5,993,012 A | * | 11/1999 | Buchanan et al. | 353/119 |
| 6,283,600 B1 | * | 9/2001 | Levasseur | 353/119 |
| 6,764,184 B1 | * | 7/2004 | Carkner | 353/119 |
| 2004/0207823 A1 | * | 10/2004 | Alasaarela et al. | 353/122 |
| 2005/0122487 A1 | * | 6/2005 | Koyama et al. | 353/94 |
| 2005/0206770 A1 | * | 9/2005 | Nathanson et al. | 348/333.1 |
| 2006/0017887 A1 | * | 1/2006 | Jacobson et al. | 353/30 |

OTHER PUBLICATIONS

Patent Abstracts of Japan, vol. 2003, No. 05, May 12, 2003, 2003005280, Publication Date Jan. 8, 2003.

* cited by examiner

*Primary Examiner*—William C. Dowling
(74) *Attorney, Agent, or Firm*—Oblon, Spivak, McClelland, Maier & Neustadt, P.C.

(57) ABSTRACT

A projector arrangement (1) is proposed wherein a first, back or illumination part (10) and a second, front or image projection part (20) are detachably attachable with respect to each other so as to form a unit at least in an operation mode of said projection arrangement (1) and to be separable or separated from each other in a non-operation mode of said projection arrangement (1) and to thereby realize a modular arrangement.

13 Claims, 11 Drawing Sheets

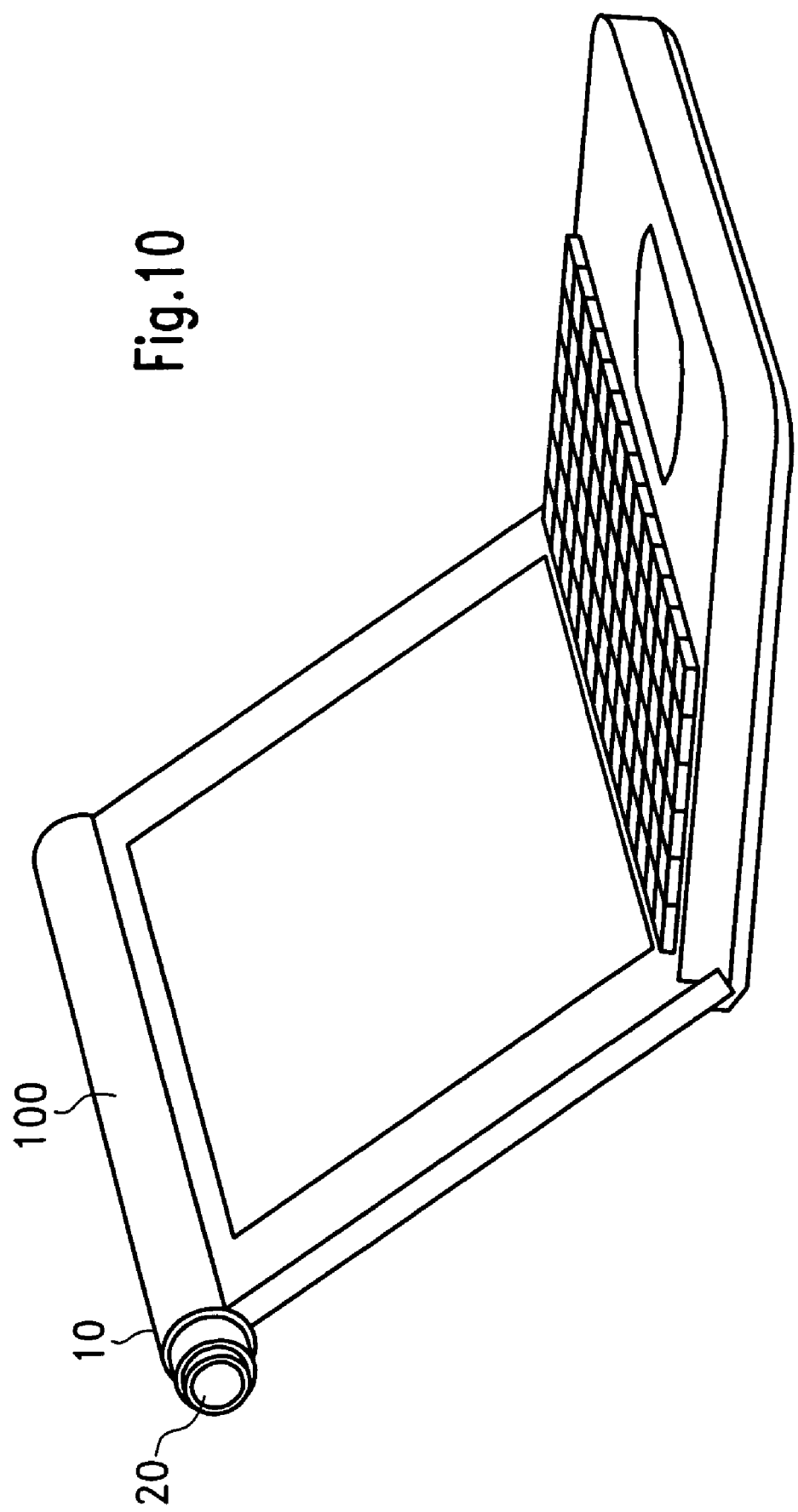

PROJECTION ARRANGEMENT AND ELECTRONIC CUSTOMER DEVICE

The present invention relates to a projection arrangement and in particular to a projection arrangement having a modular composition or architecture. Additionally, the present invention relates to a customer device comprising a projection arrangement according to the present invention.

Nowadays projection arrangements become more and more important and popular in particular as a part of so-called customer devices enabling these customer devices to display certain information contents in an optical way. Recent strategies in the process of further developing projection arrangements itself and their embedding and application in customer devices are based on the need of miniaturization and/or of improvement of reliability and flexibility.

However realizing an integrated projection arrangement with a high degree of reliability and a high degree of flexibility cannot be achieved in an easy way as known projection arrangements comprise a reasonable high number of components which have to be added to known customer devices.

It is therefore an object of the present invention to provide a projection arrangement which works with a high degree of reliability and at the same time can be applied in a comparable flexible manner.

This object is achieved by a projection arrangement according to the present invention described in the present specification. Additionally, the object is also achieved by a customer device described in the present specification.

According to the present invention the projection arrangement comprises a first, back or illumination part and at least one second, front or image projection part. The first, back or illumination part is adapted to generate, provide and/or emit primary illumination light. The second, front or image projection part is adapted to receive said primary illumination light or a derivate thereof and to project an image by using said primary illumination light or said derivate thereof and by generating, providing and/or emitting a secondary illumination light being representative for said image. It is a further basic aspect of the present invention that said first, back or illumination part and said second, front or image projection part are detachably or removably attachable with respect to another so as to form a unit at least in an operation mode of said projection arrangement and to be separable or separated from each other in a non-operation mode of said projection arrangement and to thereby realize a modular arrangement, constitution or the like.

It is therefore a key idea of the present invention to provide the essential components of the inventive projection arrangement, namely said first, back or illumination part and said second, front or image projection part as components which can be attached, mounted or fit together to enable an projection process and which can be on the other hand separated or detached or removed from each other for the case that a projection operation has not to be performed, in particular within a non-operation mode of the inventive projection arrangement. Thereby a high degree of flexibility is achieved as, for instance, a given second, front or image projection part may be used with a variety of distinct and in particular of different first, back or illumination parts. On the other hand with a given first, back or illumination part a variety of different second, front or image projection parts may be used, each of which being capable of realizing different projection situations depending on the situation in which a distinct audience have to be supplied and provided with optically displayed information.

There are different possibilities of distributing the components necessary for performing a projection process within the different first and second parts comprised in the inventive projection arrangement.

According to a first preferred embodiment of the inventive projection arrangement said first, back or illumination part comprises a light source unit and an illumination optics unit. Thereby the fundamental components of the process of providing primary illumination light are contained within said first, back or illumination part.

According to a alternative or additional aspect of the present invention said second, front or image projection part comprises a projection optics unit and in particular an objective unit. These are some of the basic components which are necessary for realizing a projection process per se. The projection optics unit preferably contains a plurality of objectives, each of which being adapted for different projection situations. Additionally, a wave guiding element and/or a light pipe element or the like may also be contained according to a further advantageous embodiment of the inventive projection arrangement.

According to a preferred alternative of the present invention the second, front or image projection part is adapted to generate and to provide an image to be projected.

In this case, said second, front or image projection part comprises an image generation unit which has in particular a micro display or the like which is adapted to receive light, for instance said primary illumination light or a derivative thereof and to produce by using said received light an image or a pre-form thereof.

According to an alternative realization of the inventive projection arrangement said first, back or illumination part may be adapted to generate and to provide an image to be projected.

In this case said first, back or illumination part comprises an image generation unit having in particular a micro display or the like. In this case, the primary illumination light already produced within said first, back or illumination part also generates by using said primary illumination light an image or a pre-form thereof which is then transferred by optical means to said second, front or image projection part which in turn then performs the pure projection process only.

According to a further preferred embodiment of the inventive projection arrangement said projection arrangement is in its entirety or at least in part embedded in an electronic customer device, in particular in mobile and/or stand alone form of the costumer device. This may be done by at least embedding said first, back or illumination part in said customer device. Further, this may be done by embedding said projection arrangement within a mobile personal digital assistant, a mobile telephone, a mobile computer device, preferably within a notebook or a laptop or the like, a mobile camera device, a mobile image, picture or video recording/processing device and/or the like.

It is of further advantage to embed said first, back or illumination part in an fixed manner within said electronic customer device.

In this case data exchange means are preferably provided to at least supply image data corresponding to an image to be projected and/or control data to said image generation unit.

According to a further aspect of the present invention a customer device is provided which comprises a projection arrangement of the present invention or a part thereof, in particular said first, back or illumination part. Preferable, said costumer device is a mobile and/or stand alone device.

In the following, these and further aspects of the present invention are explained in more detail in other words:

The present invention particularly relates to a modular micro projection display in embedded systems.

Electronic devices for example PDA, mobile telephones, notebooks, game consoles etc, becoming more compact with the use of multifunctional possibilities, like wireless connection, digital camera, special software, games etc. This market requires smart and small products, which are compact and easy to handle.

In addition, multifunctional projection capabilities can be further taken into advantage for augmented home & office environments, where one needs to project in different directions and distances, therefore at different display sizes.

A very compact and small projection display is proposed which can be separated into two parts: The back part includes light source and optics and the front contents micro display and the objective itself. It is also possible that the front part only has the objective lens or in addition also a wave guiding element and/or light pipe. In a non-operating mode, the front part of the projector can be removed. For a working mode both parts are plugged together to project an image. Varying the optical parameters of one or more of these elements, e.g. panel, objective lens, light pipe, on the modular front part one can easily adapt the display size to environment requirements, for example for projecting on an office table or as next to the wall. This front part can then easily be embedded to any device which contains an illumination part, e.g. a monitor, PDA, lamp type projector, mobile phone or the like.

Currently there is no projection display device available, which can accommodate any kind of objective lens. Rather the very expensive lenses have to be especially designed for the panel size and illumination characteristics of the device. From the optics point of view the most critical part is the exact distance between Objective lens and the panel, rather than the distance between light source or illumination part or unit and the panel. It is therefore not straightforward that any type of objective lens will automatically fit to any device with illumination unit.

Further, in the case of the proposed modular design, the two parts of the projector have to fit perfectly. The optical components have to be adjusted very well in a plug-in process. Otherwise, light in the optical path is lost.

The optical components and the micro display have to be protected well against dust dirt and scratches. If the handling is done not very properly the optical efficiency is going down and picture information can be lost because of the damage of the micro display or polarizer. The proposed optical display device may have limited brightness compared to standard projectors, but the proposed technique has the potential to replace standard LCD, because of the price and compactness.

The optical part of standard video projectors have consisting mainly of the four parts light source, optical engine, micro display, and objective. However, these standard projectors are not very compact for mobile use.

The development of new optical architectures including the use of new upcoming light sources causes a drastically reduction of the size compared to standard projectors. This allows integrating small projectors in electronic products like notebooks, handheld organizer, camcorders, mobile phones, DVD players, game consoles, lamp type projectors etc.

The invention inter alia covers a data front projector divided into two parts, i.e. a back part and a front part. For working or operation mode the two parts may be put together.

The front part contains either the micro display and objective together or only the objective. Alternatively, in order to project in different display sizes and environments more than one objective can be offered, which consist of different panel size, or objective lens or even integrated light pipe as a coupling mechanism between the panel and the objective lens.

The back part includes the light source and may include a light pipe for light coupling and homogenization. Additional lenses may be included.

This two parts can be put together in a working mode. And in off mode they can be separated to have more space.

This allows the user to choose at what time he can use the video projector. Also the user can choose which objective he can use with plastic lenses or special zoom. There a various possibilities for user. Last but not least, the integrated panel/objective lens front module can be embedded to almost any device with integrated front part (Notebook, Monitor, Lamp type projector, palmtop, digital camcorder, mobile phone, etc . . . ).

Back part and front part are connected through clipping. The optical part of new proposed video projectors can consist of several parts. The list below shows the full spectrum of used components:

Light source: Gas discharge lamp (UHP lamps), LEDs, Laser or VCELS.

Optical components: Standard lenses, Fresnel lenses, diffractive optics, polarizing elements, color recombination cubes (X Cubes), beam splitters, light pipe (light information).

Micro displays: Transmissive TFT display, Reflective Display LCoS.

These and further aspects of the present invention will be explained in more detail taking reference to the accompanying Figures.

FIGS. 1A, B are schematical and cross-sectional side-views of an embodiment of the present invention in a attached state and in a separated state, respectively.

Figure 4:
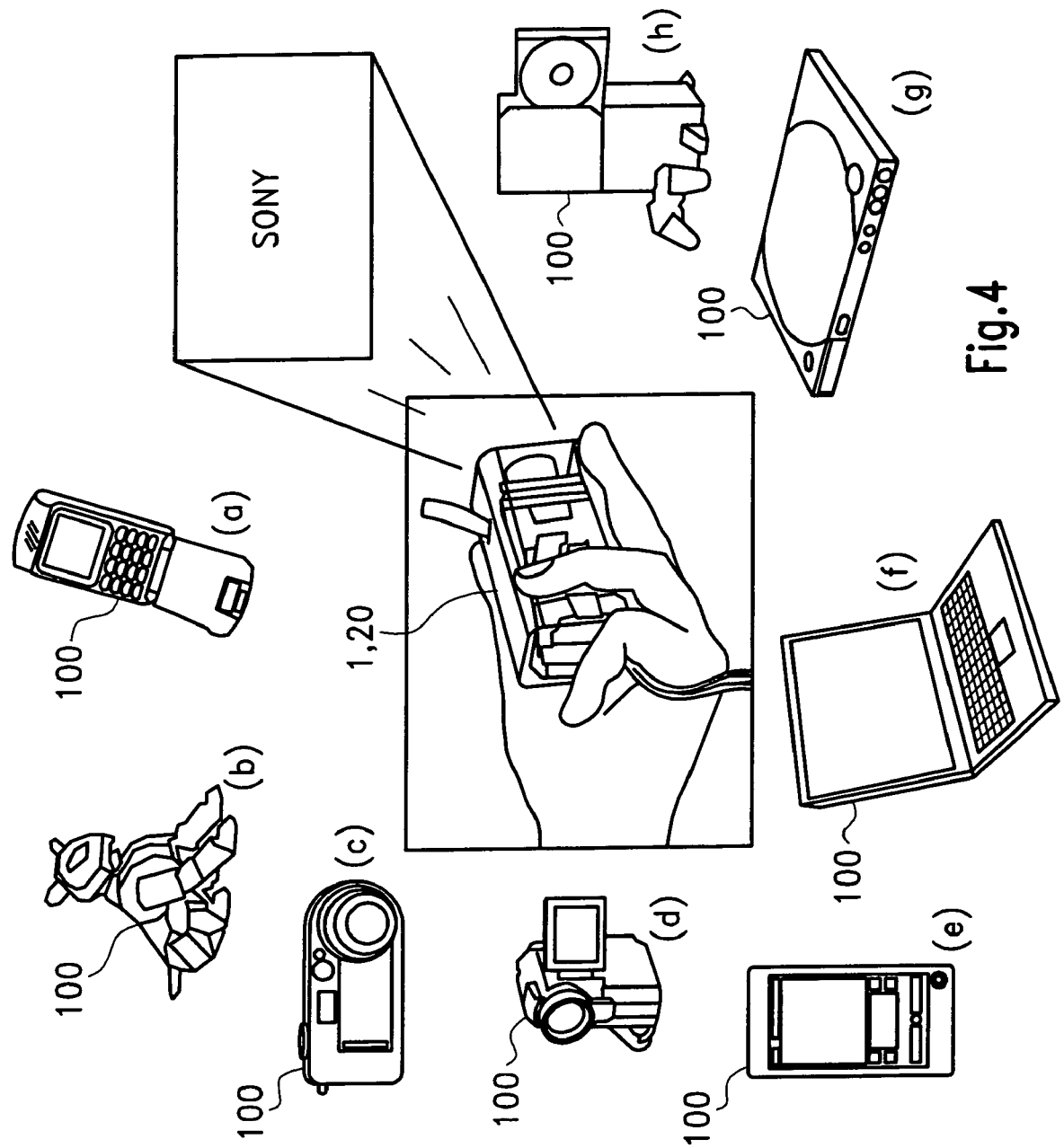

FIG. 4 demonstrates different application schemes for the present invention.

Figure 5:
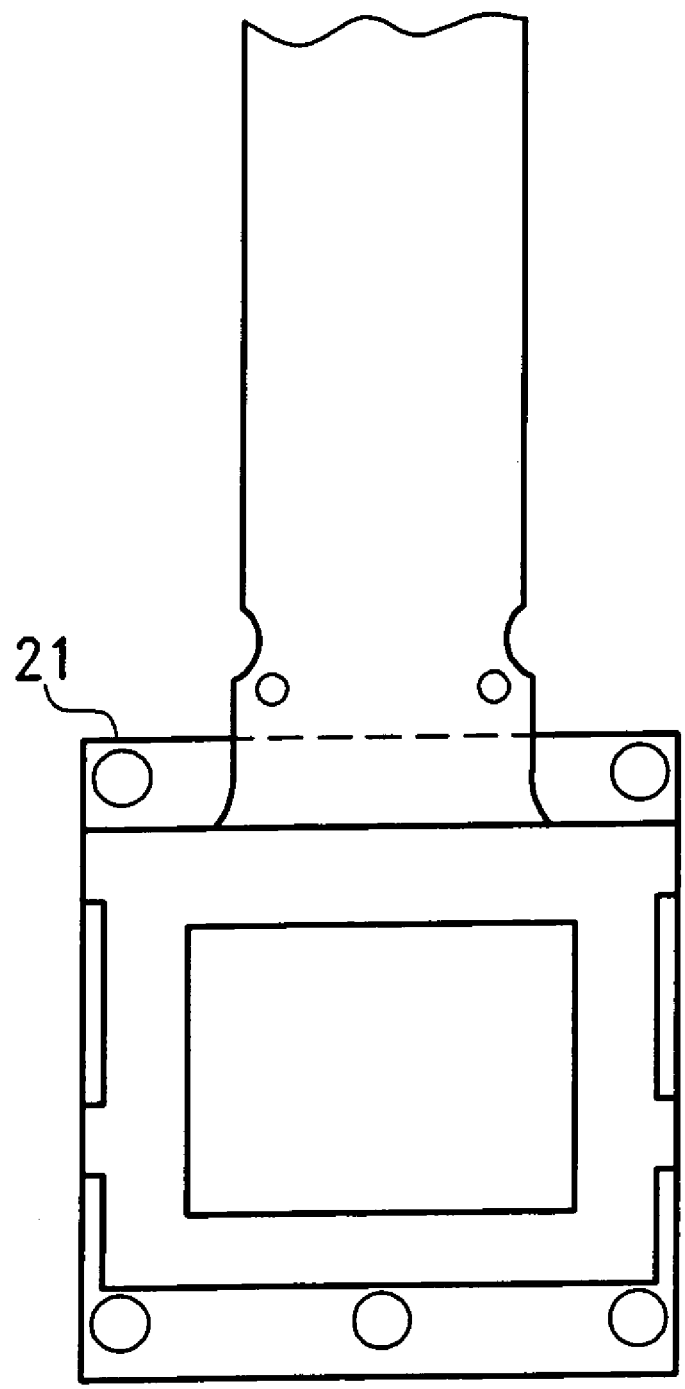
Figure 6:
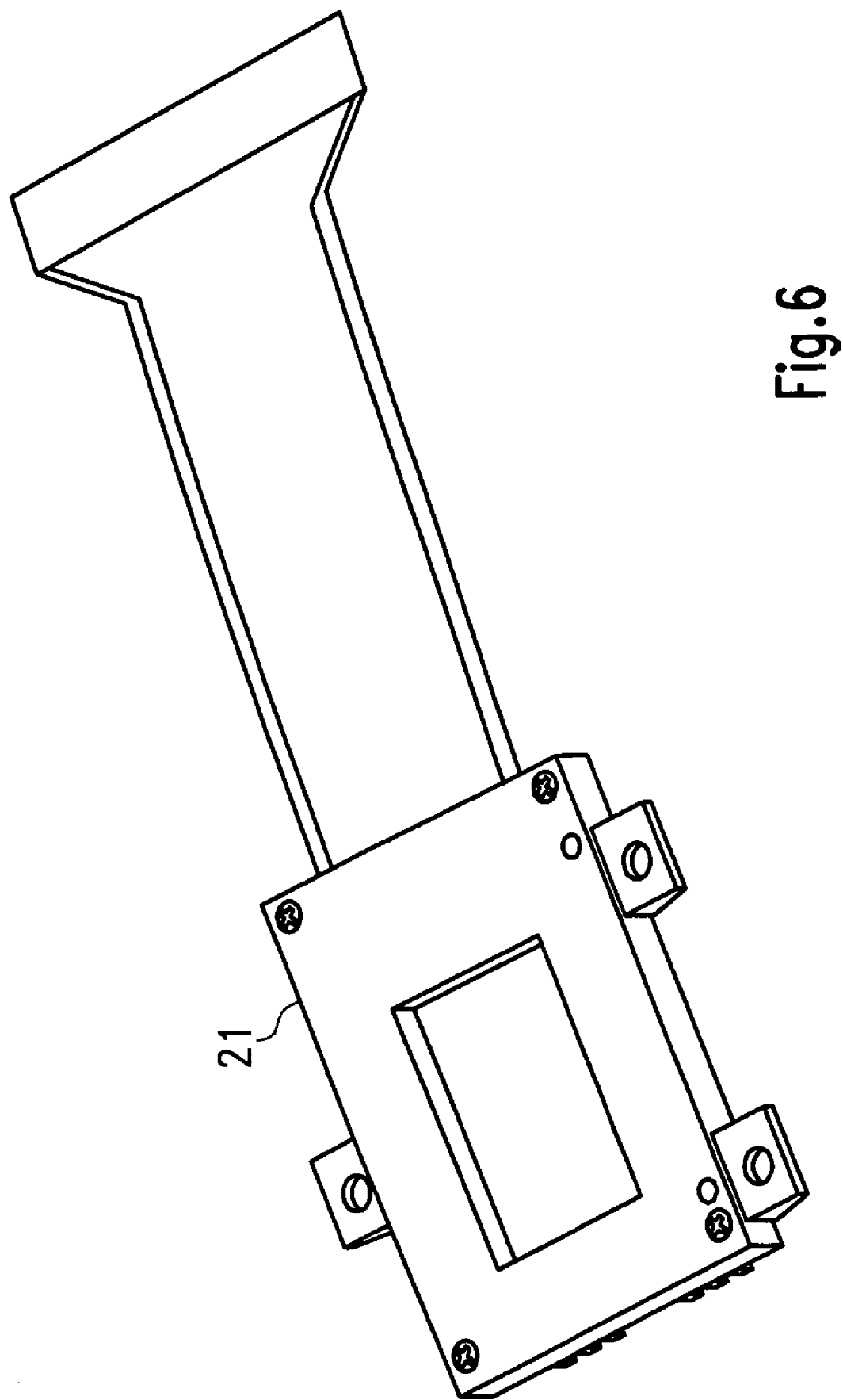
Figure 7:
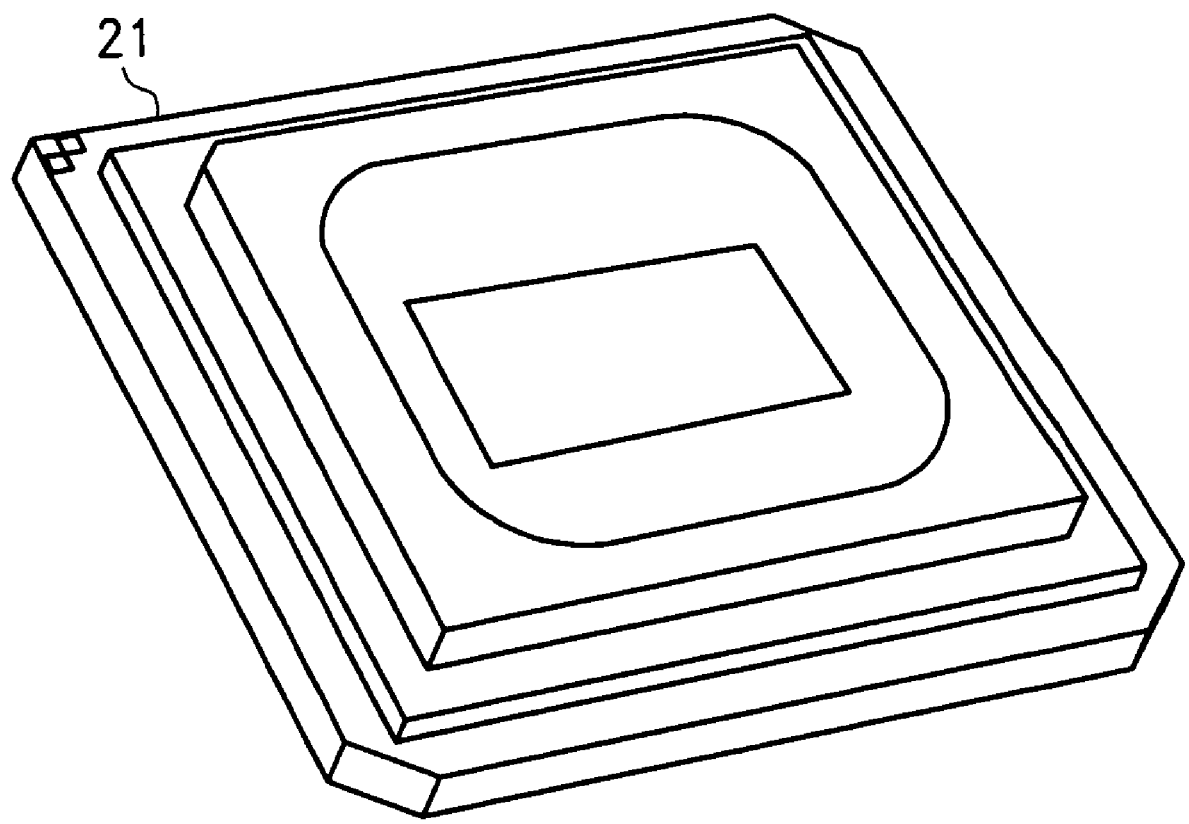

FIGS. 5–7 are perspective view for different image generating units of different embodiments of the present invention.

Figure 8:
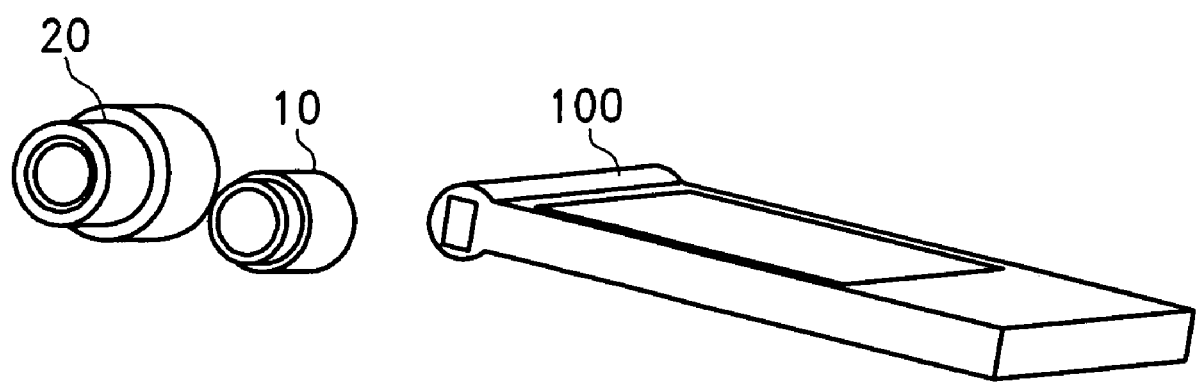
Figure 9:
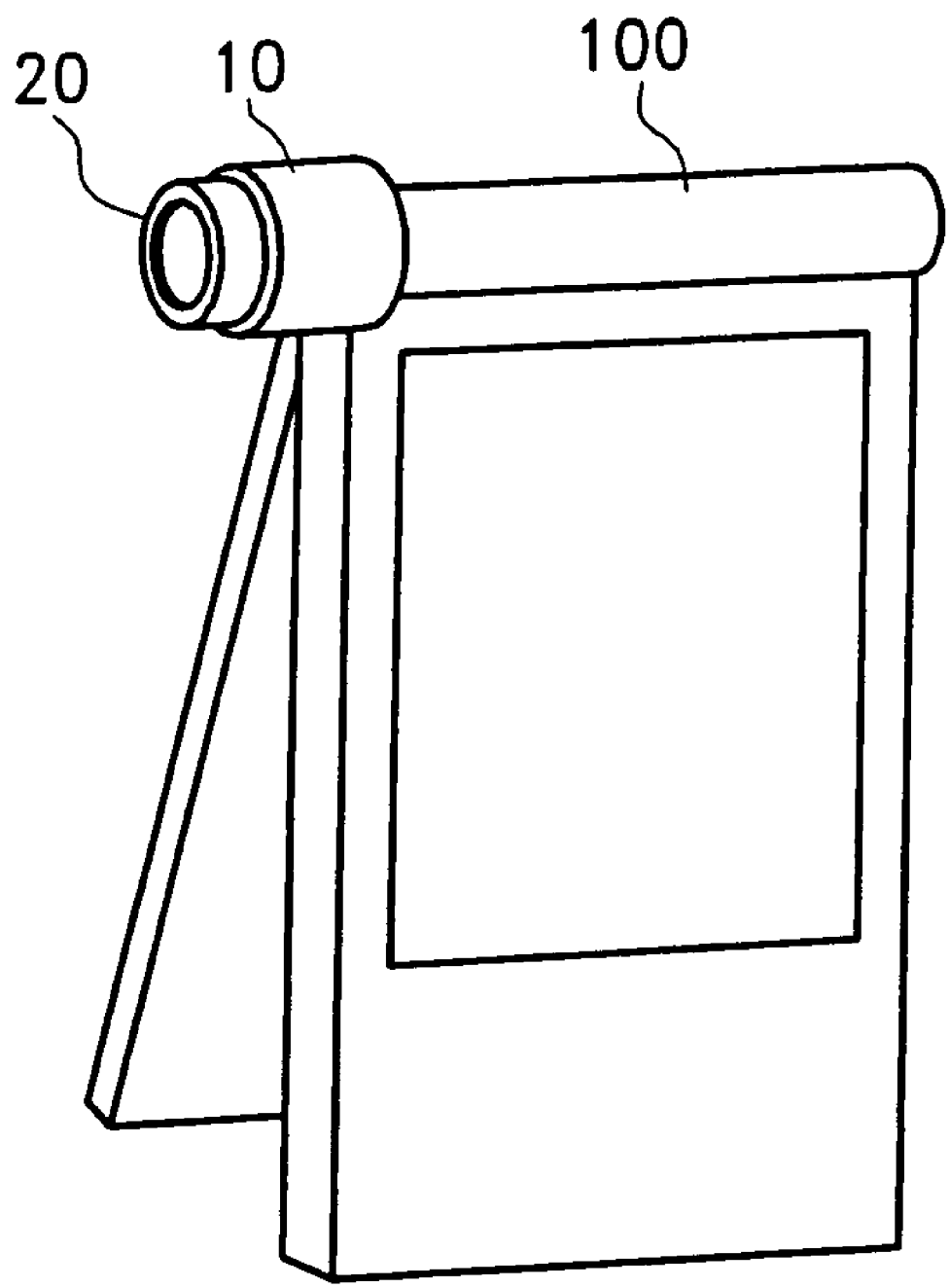

FIGS. 8, 9 demonstrate by means of perspective views the application of the present invention within a personal digital assistant device.

FIG. 10 is a perspective view of the application of the invention within a notebook computer.

In the following structural and/or functional equivalent or similar elements are denoted by identical reference symbols and their detailed description is not repeated in each case of their occurrence.

Figure 1A:
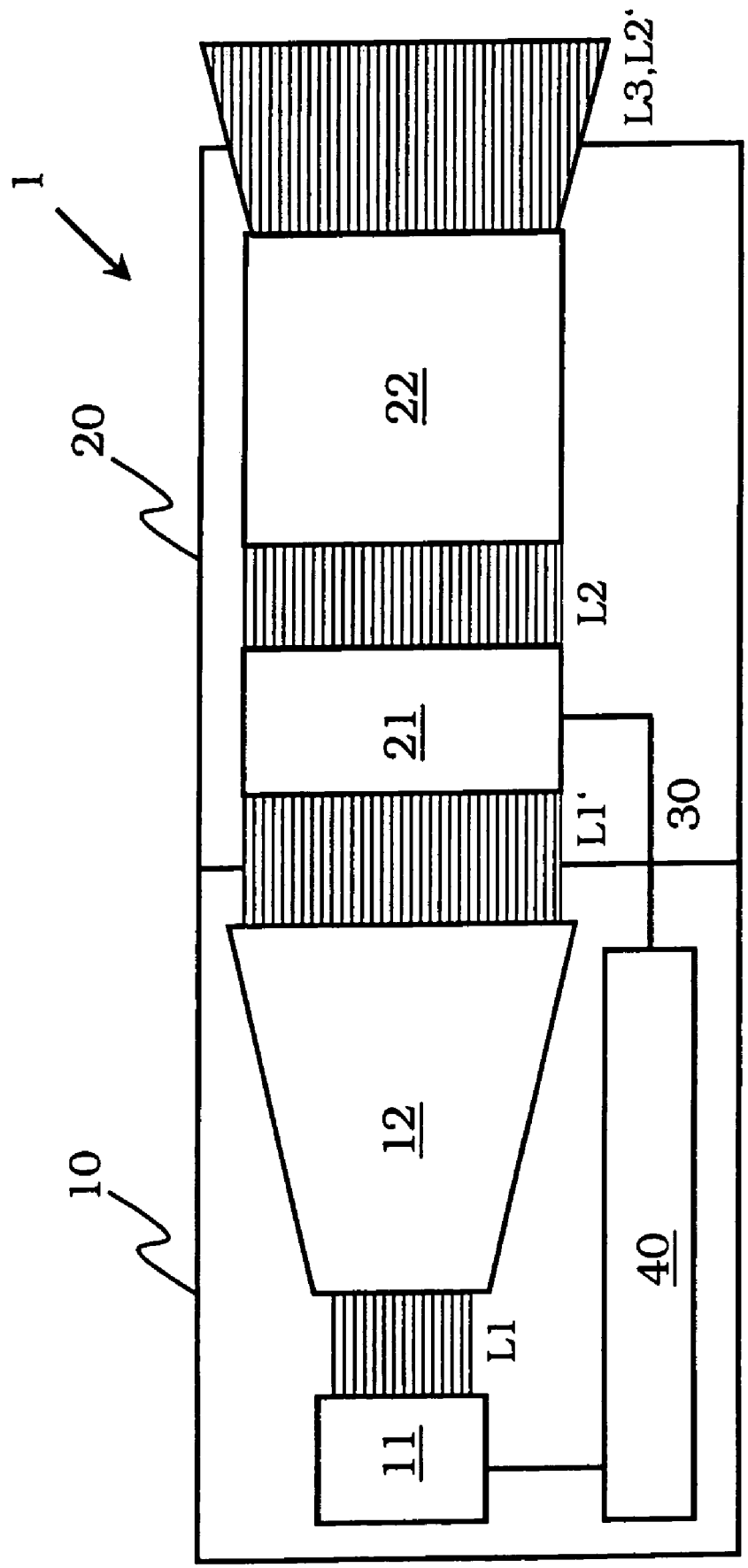
Figure 1B:
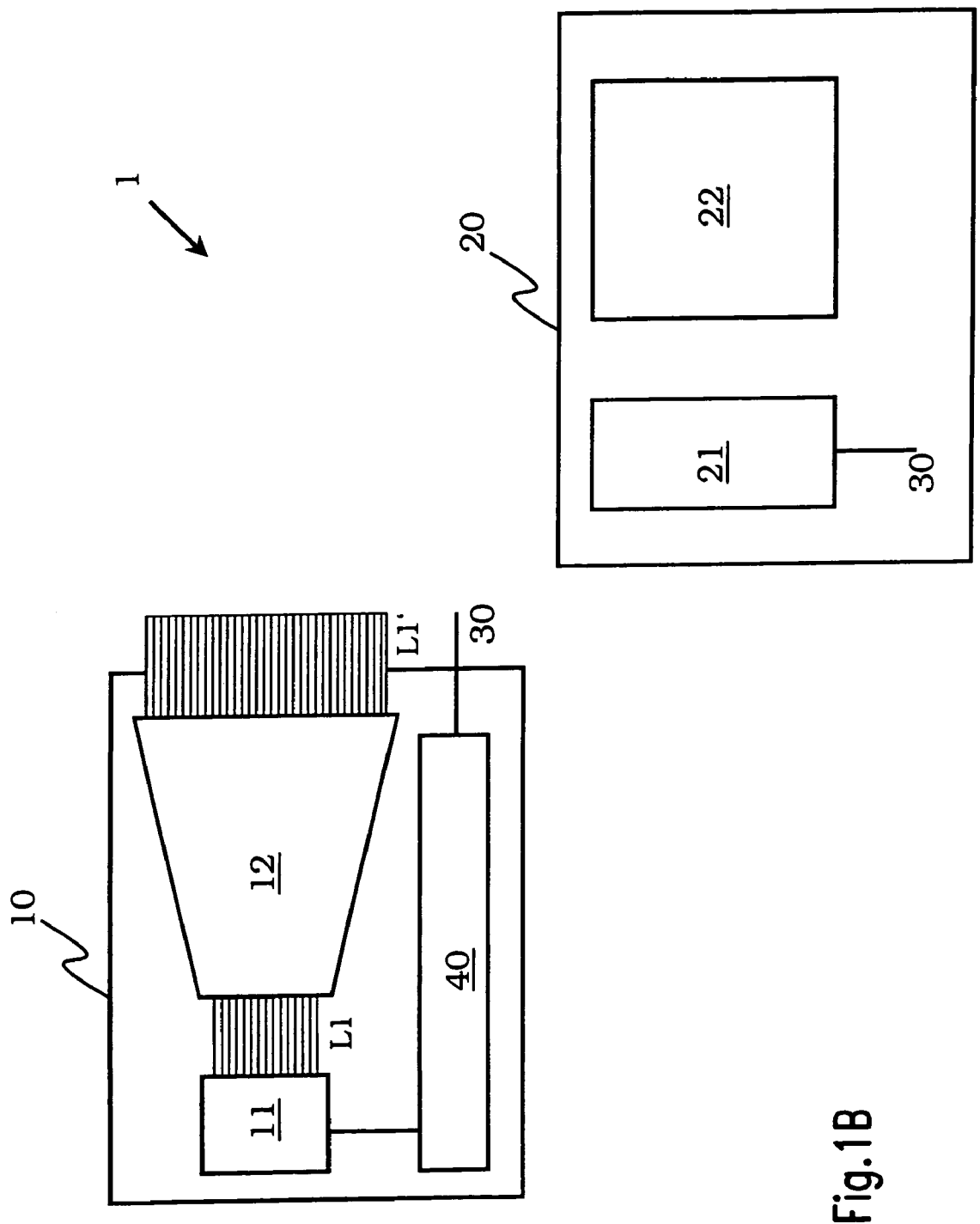

In FIGS. 1A and 1B by means of an exemplifying embodiment of the present invention some of the basic aspects of the invention are described. The inventive projection arrangement 1 is constituted by a first, back or illumination part 10 and by a second, front or image projection part 20. Said first and second parts are connected and attached with respect to each other in the situation shown in FIG. 1A and they are detached or removed from each other according to the situation shown in FIG. 1B.

The first, back or illumination part is formed by means of a light source unit 11 which generates primary illumination light L1. Then said primary illumination light L1 is received by a provided illumination optics unit 12 which is adapted for collecting, redirecting and uniformizing the received primary illumination light and to emit thereby uniformized primary illumination light L1' as a derivative of said primary illumination light L1.

The second, front or image projection part 20 is constituted by a image generation unit 21 and by a projection optics unit 22 or objective unit 22. During the operation situation or operation mode shown in FIG. 1A first and second parts of the inventive projection arrangement 1 are attached to each other in the way that the derivative L1' of the primary illumination light L1 emitted by the illumination optics unit 12 can be received and is received by the second, front or projection part 20, and in particular by the entrance of the image generation unit 21. Using said derivate L1' of the primary illumination light L1 said image generation part or unit 21 generates an image to be projected by emitting respective secondary illumination light L2 which is then received by the entrance of the projection optics unit 22 or the objective unit 22 and then emitted as projection light L3.

In contrast to the situation shown in FIG. 1A where the first and the second parts 10, 20 of the inventive projection arrangement 1 are attached to each other the both parts are removed from each other in a non-operating mode in FIG. 1B.

Via a provided control part or unit 40 the processes of illumination and of image generation within said light generation part 11 and within said image generation part 21, respectively, are controlled using respective data exchange means 31, 30 respectively.

Figure 2:
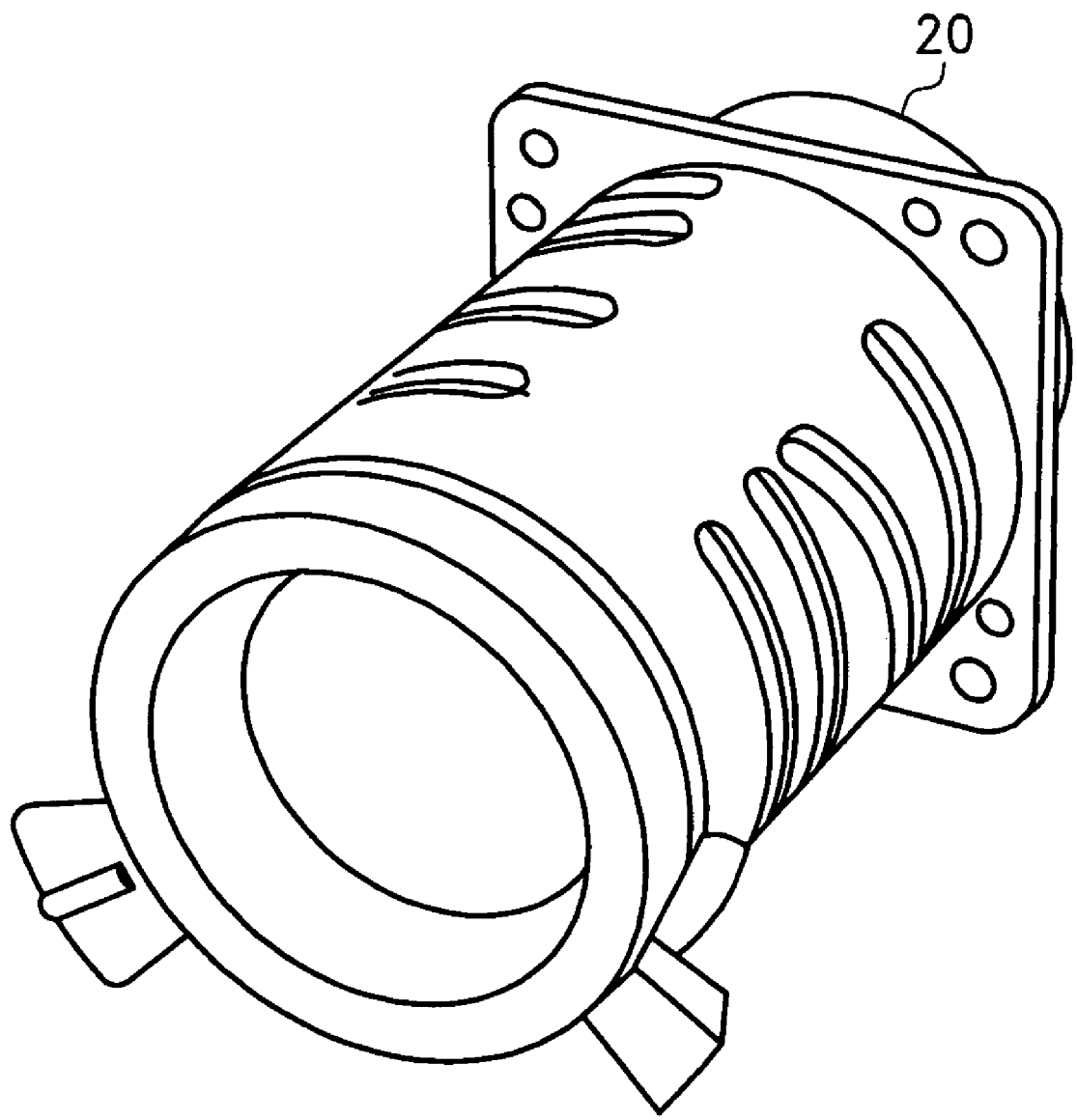
FIG. 2 is a perspective view of a second, front or image projection part of an embodiment of the present invention.

FIG. 2 shows by means of a perspective photographic view an example for a second, front or image projection unit 20 which is separated from the assigned first, back or illumination part 10.

Figure 3:
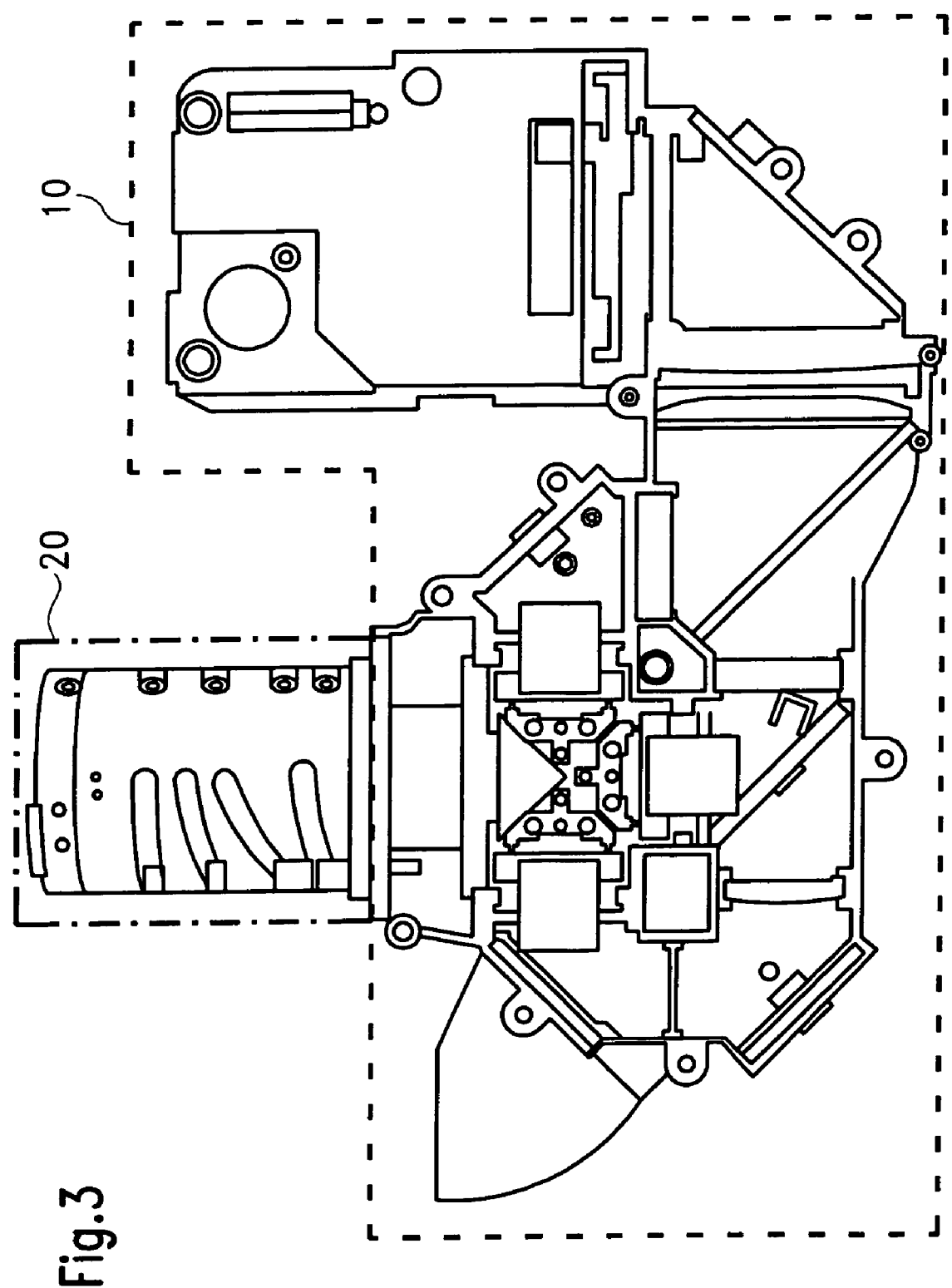
FIG. 3 is a cross-sectional top view of a further embodiment of the present invention using the projection part shown in FIG. 2.

In contrast to FIG. 2, in FIG. 3 the respective second, front or image projection part 20 is attached to the assigned first, back or illumination part 10.

FIG. 4 shows different realizations, and in particular applications of the inventive projection arrangement 1 within different electronic customer devices 100. As examples of these electronic customer devices 100 mobile telephones (a), gaming robots (b), imaging devices (c) and (d), personal digital assistants (e), laptop computers or notebook computers (f), DVD players (g) as well as videogame consoles (h) are possible.

FIGS. 5, 6 and 7 demonstrate different embodiments of image generation units 21 within different embodiments of second, front or image projection units 20.

FIGS. 8 and 9 demonstrate the application of the present invention within a personal digital assistant as a regular electronic customer device 100. In FIG. 8 the second, front or image projection unit or part 20 and the first, back or illumination part 10 are detached from each other and from the electronic customer device 100. In contrast, in FIG. 9 said first and second parts 10 and 20, respectively, are attached to the personal digital assistant as an electronic customer device so as to enable said personal digital assistant to generate and to project information which is usually displayed on the usual optical display unit by means of a projection process.

Additionally, FIG. 10 demonstrates the application of the inventive projection arrangement 1 within or as a part of a laptop or notebook computer as an electronic customer device 100.

It is a further fundamental idea of the invention to—inter alia—use according to FIG. 1B two parts 10 for light source/illumination optics and 20 for micro display. Therefore, like the use of the different objective lens in cameras the idea is here to use different panel and objective lens modules, which are interchangeable. Therefore part 10 of the light source may preferably remain embedded always in the device, whereas depending e.g. on projection distance to the screen and required brightness the respective module 20, i.e. panel and objective lens, will be adapted.

Optionally, the lumen output of the embedded light source can be electronically adjusted.

REFERENCE SYMBOLS 1 projection arrangement according to the present invention
10 first, back or illumination part or unit
11 light source unit
12 illumination optics unit
20 second, front or image projection part or unit
21 image generation unit
22 projection optics unit
30 data exchange means
31 data exchange means
40 control part or unit
100 customer device
L1 primary illumination light
L1' derivative of primary illumination light L1
L2 secondary illumination light
L2' derivative of secondary illumination light
L3 projection light

The invention claimed is:

1. Projector arrangement, comprising:
a first part configured to one of generate, provide or emit primary illumination light; and
at least one second part configured to receive the primary illumination light and to project an image by using said primary illumination light and by one of generating, providing or emitting a secondary illumination light being representative for said image, wherein
said first part and said second part are detachably attachable so as to form a unit at least in an operation mode of said projection arrangement and to be separable from each other in a non-operation mode of said projection arrangement and to thereby realize a modular arrangement,
said first part includes a light source unit having a semiconductor light source and having an illumination optics unit, and
said second part is configured to generate and to provide said image to be projected and includes an image generation unit having a micro display,
wherein said second part includes a projection optics unit having at least one objective and at least one of a wave guiding element or light pipe element.

2. Projection arrangement, comprising:
a first part configured to one of generate, provide or emit primary illumination light; and
at least one second part configured to receive the primary illumination light and to project an image by using said primary illumination light and by one of generating, providing or emitting secondary illumination light being representative for said image, wherein said first part and said second part are detachably attachable so as to form a unit at least in an operation mode of said projection arrangement and to be separable from each other in a non-operation mode of said projection arrangement and to thereby realize a modular arrangement, said first part includes a light source unit having a semiconductor light source and having an illumination optics unit, and said first part is configured to generate and to provide said image to be projected and includes an image generation unit having a micro displays, wherein said second part includes a projection optics unit having at least one objective and at least one of a wave guiding element or light pipe element.

3. Projection arrangement according to claim 1, wherein at least a part of the projection arrangement is embedded in one of a mobile or a stand alone electronic customer device, which is one of devices including a mobile personal digital assistant (PDA), a mobile telephone, a mobile computer device, a notebook computer, a laptop computer, a mobile camera device, a mobile image recording/processing device, a picture recording/processing device, or a video recording/processing device.

4. Projector arrangement according to claim 3, wherein said first part is fixedly embedded within said electronic customer device.

5. Projection arrangement according to claim 4, wherein a data exchange unit is provided to at least supply image data corresponding to an image to be projected to said image generation unit.

6. A customer device comprising a projection arrangement according to claim 1.

7. A customer device according to claim 6, which is one of a mobile device or a stand alone device.

8. Projection arrangement according to claim 2, wherein said second part includes a projection optics unit having at least one objective and at least one of a wave guiding element or a light pipe element.

9. Projection arrangement according to claim 2, wherein at least a part of the projection arrangement is embedded in one of a mobile or a stand alone electronic customer device, which is one of devices including a mobile personal digital assistant (PDA), a mobile telephone, a mobile computer device, a notebook computer, a laptop computer, a mobile camera device, a mobile image recording/processing device, a picture recording/processing device, or a video recording/processing device.

10. Projector arrangement according to claim 9, wherein said first part is fixedly embedded within said electronic customer device.

11. Projection arrangement according to claim 10, wherein a data exchange unit is provided to at least supply image data corresponding to an image to be projected to said image generation unit.

12. A customer device comprising the projection arrangement according to claim 2.

13. A customer device according to claim 12, which is one of a mobile device or a stand alone device.

* * * * *